(No Model.)
D. McC. WALDEN.
Combined Cotton Seeder and Fertilizer.
No. 241,836. Patented May 24, 1881.
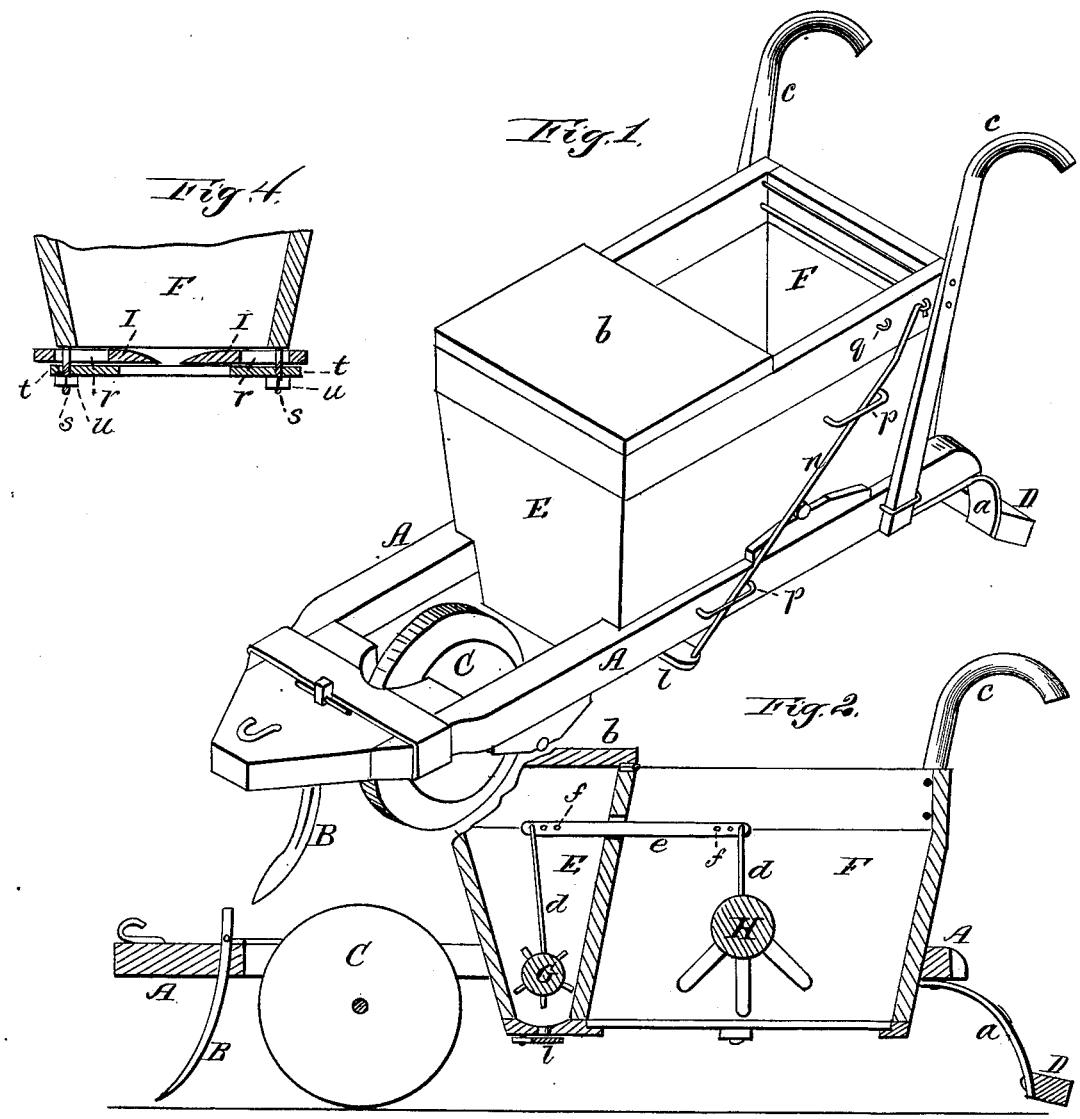
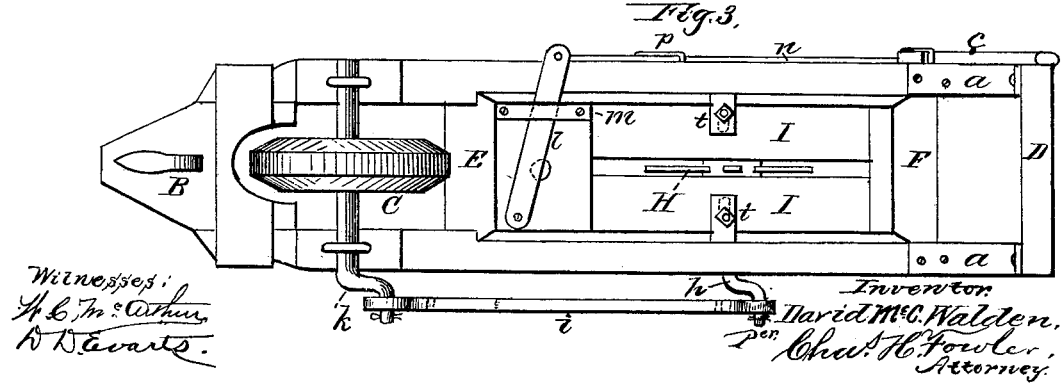

UNITED STATES PATENT OFFICE.

DAVID McCINDREY WALDEN, OF VARNELL'S STATION, GEORGIA.

COMBINED COTTON-SEEDER AND FERTILIZER.

SPECIFICATION forming part of Letters Patent No. 241,836, dated May 24, 1881.

Application filed April 11, 1881. (No model.)

*To all whom it may concern:*

Be it known that I, DAVID MCCINDREY WALDEN, a citizen of the United States, residing at Varnell's Station, in the county of Whitfield and State of Georgia, have invented certain new and useful Improvements in Combined Cotton-Seeder and Fertilizer; and I do hereby declare that the following is a full, clear, and exact description of the same, reference being had to the annexed drawings, making a part of this specification, and to the letters and figures of reference marked thereon.

Figure 1 of the drawings is a perspective view of my invention. Fig. 2 is a sectional elevation. Fig. 3 is an under-side plan view, and Fig. 4 is a detail view in section of the adjustable slides which form the bottom of the seed-hopper.

My invention has for its object to furnish an improved machine for dropping and planting cotton or other seed and at the same time distributing guano or other fertilizer, and which is not only simple in its construction, but effective and practical in its operation; and it consists in the construction and combination of the various parts of the machine, as shown in the drawings and hereinafter described.

In the accompanying drawings, A represents the frame of the machine, to the forward end of which are connected the plow B and wheel C.

To the rear end of the frame A is attached by spring-bars $a$ the coverer D, which may be of the usual form. These spring-bars are formed of flat metallic straps, one end being connected to the under side of the frame A, so that increased strength will be secured, which is required by the upward pressure on the under side of the coverer D.

Supported upon the frame A are the hoppers E F—the hopper E for the reception of the fertilizer and the hopper F for the cotton or other seed, the hopper E having a suitable hinged cover, $b$, to close it and prevent the sun from coming in contact with the fertilizer, which would tend to deprive it of its strength.

To the sides of the frame A are connected suitable handles, $c$, and, if desired, said frame may be so constructed as to be taken apart and put together by suitable bands and cleats, thereby enabling the hoppers E F to be removed when required.

Within the hopper E is located an agitator, G, the ends of its shaft having its bearings in the sides of said hopper. This agitator G has imparted to it a vibratory motion, to feed the fertilizer to the opening at the bottom of the hopper.

In the hopper F is located an agitator, H, which agitator also has a vibratory or an oscillating motion. This motion is imparted to the agitators G H in the following manner: Each agitator has rigidly connected to it a rod, $d$, attached at its upper end to a horizontal bar, $e$, said bar at both ends having a series of holes, $f$. This construction admits of decreasing or increasing the extent of stroke of the bar $e$, and thus regulate the motions of the agitators. One end of the shaft of the agitator H passes through the side of the hopper F and beyond the side of the frame A, and is bent to form a crank, $h$, over the end of which loosely fits one end of a crank-arm, $i$, the other end of the crank-arm being similarly connected to a crank, $k$, formed upon one end of the axle of wheel C.

It will now be seen that as motion is given to the wheel C through the crank $k$, bar $i$, and crank $h$, motion will also be imparted to the agitator H, and by the connecting-bar $e$ to the agitator G.

The feed-opening in the bottom of the hopper E is either closed or opened to any desired degree by the plate $l$, pivoted to the under side of said hopper, the plate being guided in its movement by a strap, $m$. The plate $l$ extends out beyond the side of the frame A, and has connected to it one end of a rod, $n$, which passes up through staples $p$, and is hooked into eyes $q$, fastened to the side of the hopper F, near the upper edge thereof. This rod $n$ holds the plate $l$ either closed or opened to any desired degree by engaging the hooked end of the rod with one of the staples $q$.

The bottom of the hopper F is composed of two transversely-sliding sections, I, which have elongated openings or slots $r$. Screw-bolts $s$ are rigidly connected to the under side of the hopper, and pass through the slots $r$ and through blocks $t$, the sections I being held in the position adjusted by the nuts $u$. The blocks $t$ cover the slots $r$ upon the under side of the sections, which prevent the seed from passing through and compel it to escape only between the inner edges of the sections, which are beveled to insure a free delivery of the seed. These sections I can be adjusted to bring their inner edges to or from each other to any extent, thereby increasing or decreasing the width of discharge, as circumstances may require. The sections I, also the blocks t, are removable from the bottom of the hopper F, so that the same can be cleaned from the under side.

I am aware it is old to provide a seed-planter and fertilizer with two separate and independent hoppers for the seed and fertilizer, and operating the agitators therein by an arrangement of levers connected thereto and to the axle of the driving-wheel. I am further aware that it is not new to provide the hoppers at the bottom with slides or other similar means for closing or opening the orifice to regulate or control the discharge of the seed or fertilizer. I do not therefore desire to be understood as claiming, broadly, any of the constructions named; but, Having fully described my invention, what I claim as new, and desire to secure by Letters Patent, is—

In a seed-planter and fertilizer, the hoppers E F, provided, respectively, with the pivoted plate $l$ and rod $n$, and the adjustable sections I, formed with slots $r$ and blocks $t$, in combination with the agitators G H, rods $d$, and bar $e$, all contained within the hoppers, said agitator H being operated by the arm $i$ and cranks $h$ $k$, as shown and described.

In testimony that I claim the above I have hereunto subscribed my name in the presence of two witnesses.

DAVID McCINDREY WALDEN.

Witnesses:
DAVID L. ESLINGER,
BERNARD C. HEADRICK.